United States Patent
Boots (10) Patent No.: US 9,629,351 B2
(45) Date of Patent: Apr. 25, 2017

(54) FISHING ROD HOLDER FOR USE ON A SQUARE TUBE

(71) Applicant: Ronald E. Boots, Kansas City, MO (US)

(72) Inventor: Ronald E. Boots, Kansas City, MO (US)

( * ) Notice: Subject to any disclaimer, the term of this patent is extended or adjusted under 35 U.S.C. 154(b) by 0 days.

(21) Appl. No.: 14/950,868

(22) Filed: Nov. 24, 2015

(65) Prior Publication Data
US 2016/0106085 A1  Apr. 21, 2016

(51) Int. Cl.
*A01K 97/10* (2006.01)
*A01K 99/00* (2006.01)
*A01K 97/00* (2006.01)
*B29L 31/00* (2006.01)

(52) U.S. Cl.
CPC .............. *A01K 97/10* (2013.01); *A01K 97/00* (2013.01); *A01K 99/00* (2013.01); *B29L 2031/7002* (2013.01); *B62B 2202/402* (2013.01); *Y02P 60/60* (2015.11); *Y02P 60/62* (2015.11); *Y10S 224/922* (2013.01)

(58) Field of Classification Search
CPC ..................................................... A01K 97/10
See application file for complete search history.

(56) References Cited

U.S. PATENT DOCUMENTS

| | | |
|---|---|---|
| 1,753,501 A | 4/1930 | Christensen |
| 2,430,112 A | 11/1947 | Hamre |
| 2,481,338 A * | 9/1949 | Palmer .................... A01K 97/10 248/530 |
| 2,519,612 A | 8/1950 | Tuttle |
| 2,522,223 A | 9/1950 | Hardin et al. |
| 3,669,390 A * | 6/1972 | Nielson ................... A01K 97/10 248/156 |
| 3,739,918 A * | 6/1973 | Kreitzburg ................ A47F 7/18 211/181.1 |
| 4,656,774 A * | 4/1987 | Terrill ..................... A01K 97/10 248/545 |
| 4,866,873 A * | 9/1989 | Van Valkenburg .... A01K 97/10 248/538 |
| D332,821 S | 1/1993 | Padilla |
| D485,164 S * | 1/2004 | Gibbens ......................... D8/499 |
| 7,080,811 B2 | 7/2006 | Thompson |
| D555,461 S | 11/2007 | Tincher |
| 7,418,798 B2 | 9/2008 | Barrett |
| 2003/0230023 A1* | 12/2003 | Lu .......................... A01K 97/10 43/21.2 |

(Continued)

FOREIGN PATENT DOCUMENTS

FR  1500154 A  * 11/1967  ............. A01K 97/10
GB   578361 A  *  6/1946  ............. A01K 97/10

*Primary Examiner* — Stanton L Krycinski
*Assistant Examiner* — Chiedu Chibogu
(74) *Attorney, Agent, or Firm* — Kenneth W. Iles (57) ABSTRACT

A fishing rod holder for use on a square tube is made from a single length of stiff wire that is bent to form a top leg and a bottom leg that both embrace and contact the square tube be being bent to grip side walls of the square tube with a middle portion of the fishing rod holder bent to form a forward U-shaped channel with an upward facing opening that a forward portion of a fishing rod rests in and a rearward U-shaped channel with a downward opening that restrains the upward movement of the fishing rod handle.

8 Claims, 6 Drawing Sheets

(56) References Cited

U.S. PATENT DOCUMENTS

2007/0130818 A1* 6/2007 Green ................... A01K 97/01
 43/15
2011/0303809 A1* 12/2011 Tincher ................. A01K 97/10
 248/214

* cited by examiner

FISHING ROD HOLDER FOR USE ON A SQUARE TUBE

CROSS-REFERENCE TO RELATED APPLICATIONS

Not Applicable.

STATEMENT REGARDING FEDERALLY SPONSORED RESEARCH OR DEVELOPMENT

Not applicable.

SEQUENCE LISTING

Not applicable

BACKGROUND OF THE INVENTION

The present invention is related to a device for holding a fishing rod. More particularly the present invention is a fishing rod holder that can be mounted to a square pole or rod and that will securely hold a fishing rod.

DESCRIPTION OF THE RELATED ART INCLUDING INFORMATION DISCLOSED UNDER 37 C.F.R. 1.97 and 1.98

Recreational fishermen sometimes want to stop holding their fishing rod while at the same time continuing to fish. Many types of fishing rod holders have been developed for this purpose. Some are mounted on a boat, for example Hamre, U.S. Pat. No. 2,430,112. Some are mounted on stakes that are pushed into the ground, such as Barrett, U.S. Pat. No. 7,418,798 B2; Padilla, US Des. 332,821; Tuttle, U.S. Pat. No. 2,519,612 and Harden et al., U.S. Pat. No. 2,522,223.

People like to fish from docks. Some docks have wooden decks and sometimes fishermen will drive a stake mounted fishing rod holder into the wooden deck. Dock owners sometimes object, since this practice clearly damages the deck.

More and more docks being built for recreational use have a concrete deck because they last longer than wooden decks. Obviously a stake mounted fishing rod holder cannot be used on a dock having a concrete deck. Most of these new concrete docks are covered by a roof that is supported by a number of square tube columns, which are typically 5 cm by 5 cm (2 inches by 2 inches). These support members are typically adjacent to the perimeter of the deck and are therefore close to the water. The support members would seem to provide a convenient support member for a fishing rod holder. None of the above patents discloses a fishing rod holder that could be used in connection with or mounted on a square tube or column.

Most of these columns are not accessible at their bottom ends because they are seated in poured concrete. Most of these columns are not accessible from the top since a roof is mounted on the top of the columns. In any case, it would not be possible for the fisherman to reach the top of any column without a stool or the like.

Therefore, it would be desirable to provide a fishing rod holder that can be mounted on a square cross section tube or column. It would be also be desirable to provide a fishing rod holder for a square cross section tube or column that can be mounted on the column anywhere along the height of the column without access to the top or the bottom of the column. It would also be desirable for such a fishing rod holder to be light weight and easy to manufacture and to use.

BRIEF SUMMARY OF THE INVENTION

Accordingly, it is a primary object of the present invention to provide a fishing rod holder for use on a square tube that can be securely mounted on a square cross section tube or column.

It is another object of the present invention to provide a fishing rod holder for use on a square tube that can be securely mounted on a square cross section tube or column anywhere along the length or height of the column.

It is another object of the present invention to provide a fishing rod holder for use on a square tube that can be securely mounted on a square cross section tube or column without having access to the top or the bottom of the column.

It is another object of the present invention to provide a fishing rod holder for use on a square tube for use on a square tube that is lightweight.

It is another object of the present invention to provide a fishing rod holder for use on a square tube that is easy to manufacture.

It is another object of the present invention to provide a fishing rod holder for use on a square tube that is easy to use.

These and other objects of the present invention are achieved by providing a one-piece wire fishing rod holder made of bent stiff wire having a bottom leg portion that is bent to contact and embrace the right side and font side of the square tube and a top leg that is bent to contact and embrace the rear side and left side of the square tube, with the intermediate portion of the fishing rod holder bent to provide an upward facing U-shaped bracket portion that a forward portion of the fishing rod handle rests in and a rear inverted U-shaped bracket portion that restrains the proximal end of the fishing rod handle. The leg portions of the fishing rod holder are coated with tool dip or the like to provide a finish that increases the friction between the square tube and the fishing rod holder and that does not mar the square tube. When a downward force is applied to the distal end of a fishing rod held in the fishing rod holder, such as by a biting fish, the downward force secures the fishing rod more securely in the fishing rod holder and also increases the grip of the fishing rod holder on the square tube, assuring that the fishing rod holder does not slip on the square tube.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

DETAILED DESCRIPTION OF THE INVENTION

Figure 1:
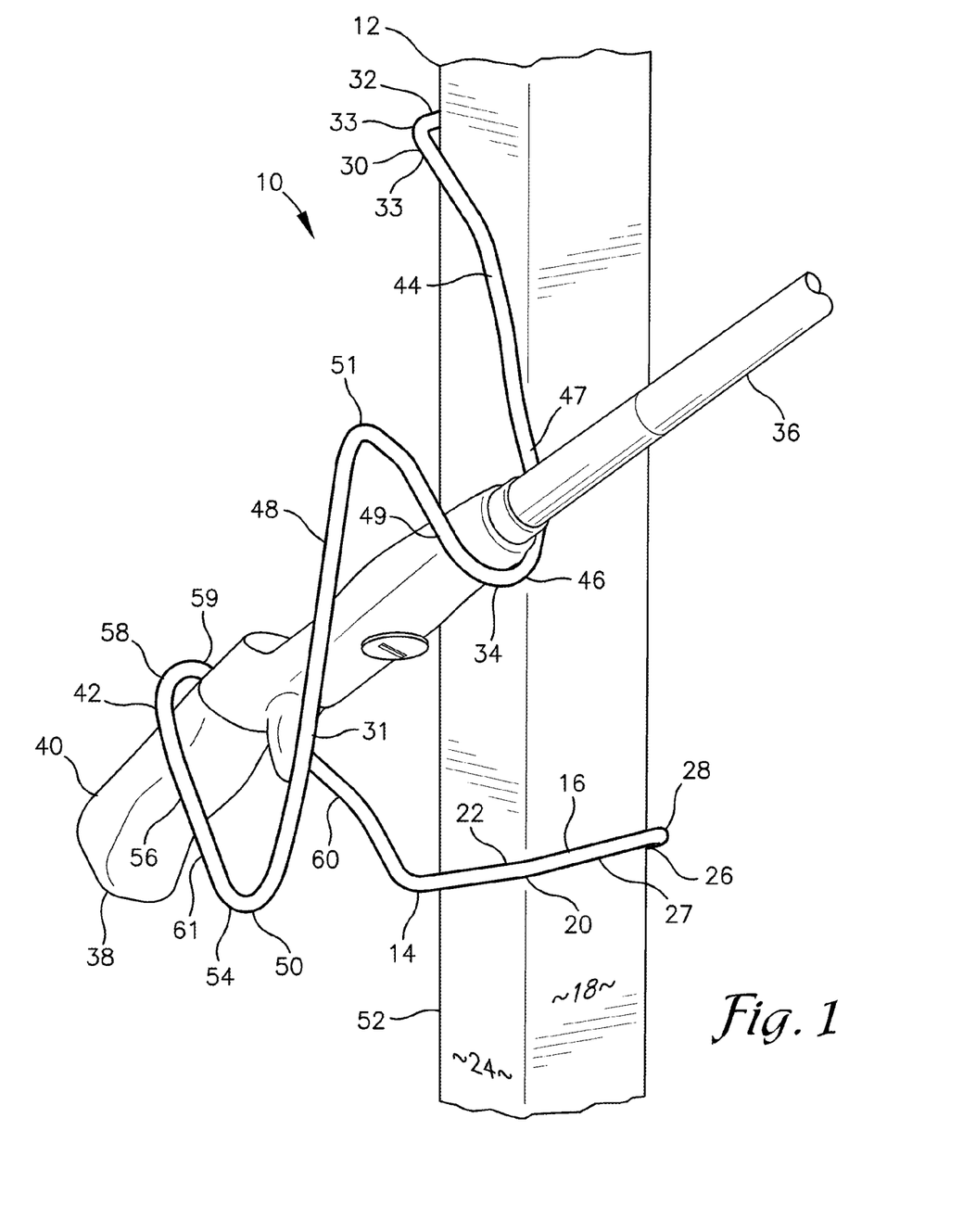
FIG. 1 is a front-right perspective view of a fishing rod holder for use on a square tube according to the present invention shown mounted on a square tube and holding a fishing rod.
Figure 2:
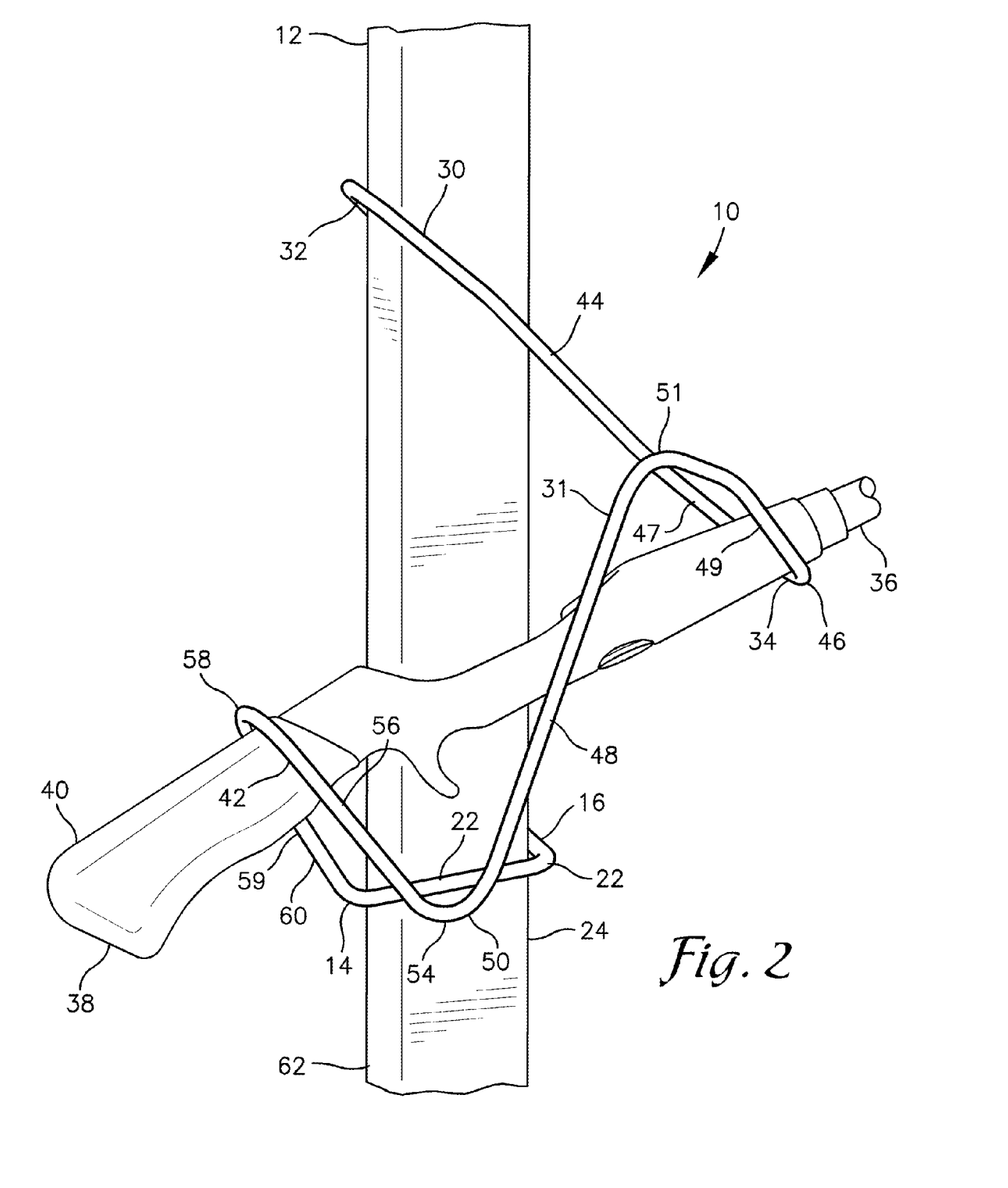
FIG. 2 right-rear perspective view of the of the fishing rod holder for use on a square tube of FIG. 1 shown with the fishing rod and the square tube of FIG. 1.
Figure 3:
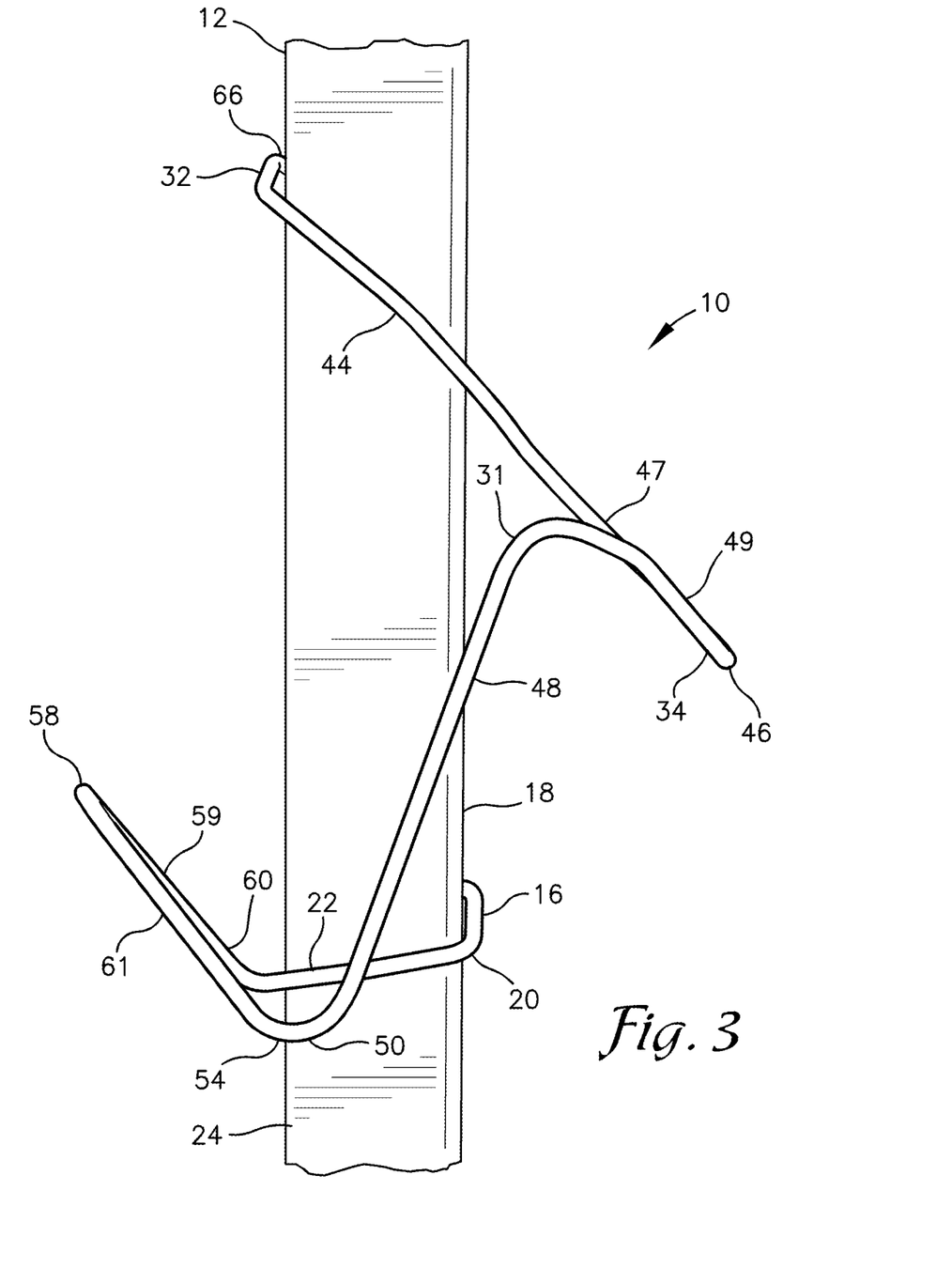
FIG. 3 is a slightly offset right side perspective view of the fishing rod holder for use on a square tube of FIG. 1 shown mounted on a square tube.

Referring to FIGS. 1-3, the fishing rod holder for use on a square tube, or fishing rod holder, 10 is shown mounted on a square tube or column 12, with the primary consideration being that the square tube has a uniform square or rectangular cross sections throughout its length. The fishing rod holder 10 is formed from a single length of stiff wire or rod, preferably steel, but need not be spring steel and, while stiff, can be bent fairly easily, which is desirable for mounting and dismounting the fishing rod holder 10 from a square tube 12. The fishing rod holder has a bottom leg 14 that has a front face portion 16 that contacts the front face 18 of the square tube 12, formed by the 90° bend 20, forming a right side portion 22 that contacts the right face 24 of the square tube 12. A distal end 26 of the bottom leg portion 14 wraps around to the left face of the square tube 12, gripping the square tube 12. The structure of the bottom leg 14 provides firm contact between the bottom leg 14 and the right face 24 and the front face 18 of the square tube 12, with the 90° bend 28 adjacent to the distal end 26 of the bottom leg 14 providing a hook-like catch that contacts the left side (see, FIGS. 4, 5) and retains the bottom leg 14 in place. The bottom leg portion 14 is a bottom leg U-shaped bracket 27 that contacts three faces of the square tube 12, although the contact at the distal end 26 is short.

Figure 5:
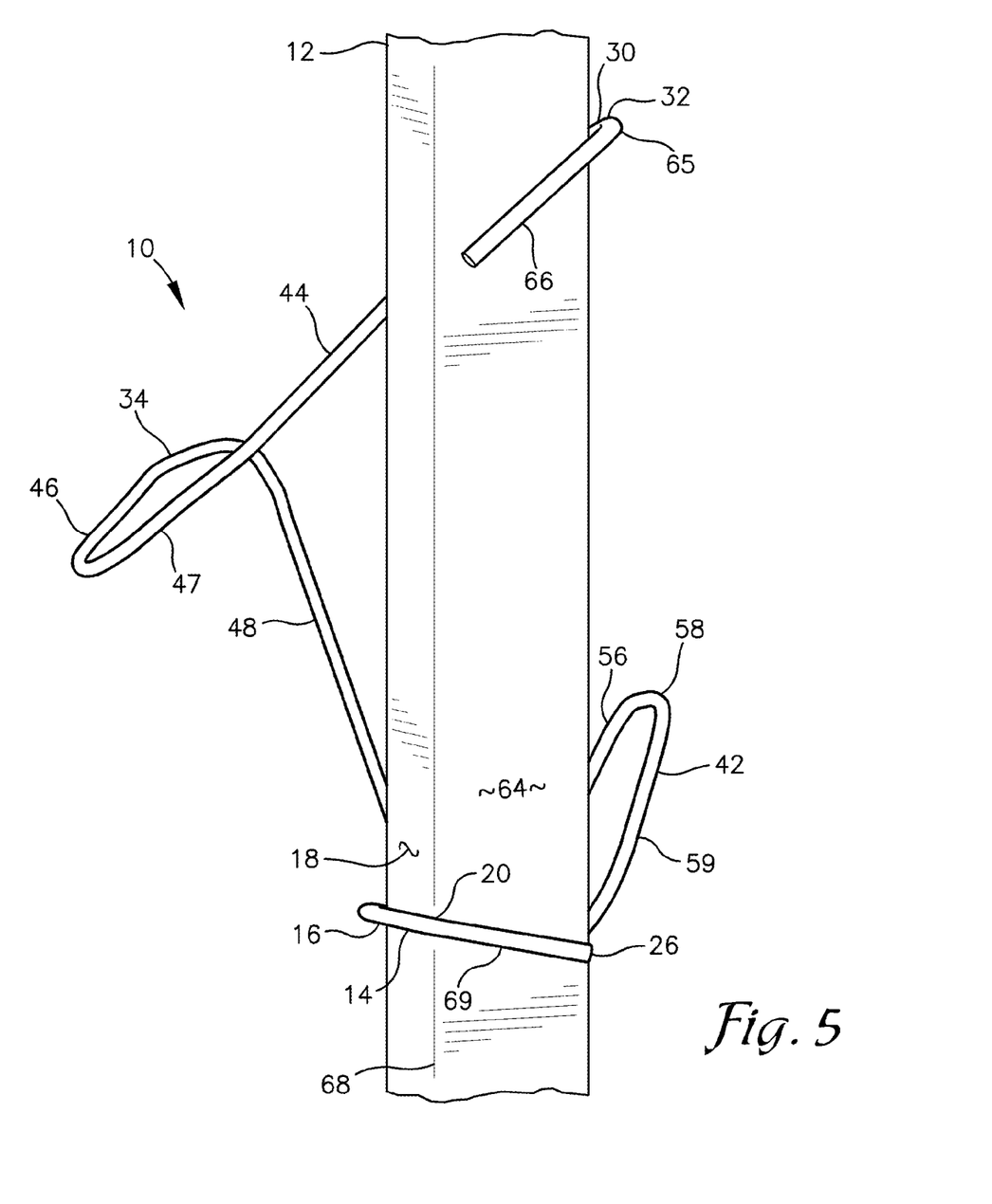
FIG. 5 is a left-front perspective view of the fishing rod holder for use on a square tube of FIG. 1 shown mounted on a square tube.

A top leg 30 includes a rear face contacting portion 32 that is formed by the 90° bend 33 away from the right face 24 of the square tube 12 and that contacts the rear face 62 (see FIG. 5). A 90° bend 65 toward the front of the fishing rod holder 10 forms the left face contacting top leg portion 66 and contacts the left face 64 (see FIG. 5) of the square tube 12. The top leg portion 66 is also bent downward, facilitating mounting and dismounting of the fishing rod holder 10 by shortening the proportion of the width of the left face 64 that is contacted by the top leg portion 66. The top leg 30 of the fishing rod holder 10 is a top leg U-shaped channel bracket 33 that wraps around three of the four faces of the square post 12, although it does not contact the right face 24 of the square tube 12 for very far.

In between the top leg 30 and the bottom leg 14 is a series of bends that form a fishing rod holding portion 31. The structure produces a forward U-shaped holder portion 34 in which the open portion of the U-shape faces upwardly, forming a U-shaped bracket. A point along the fishing rod 36 that is in front of the proximal end 38 of the handle 40 rests in the U-shaped holder portion 34. The structure also produces a rear U-shaped holder portion 42, in which the open end of the U-shape portion faced downward and receives the handle 40 of the fishing rod 36 at a point adjacent to the proximal end 38 of the fishing rod 36. That is, the rear U-shaped holder portion 42 is an inverted U-shaped bracket. This structure restrains the proximal end 38 of the fishing rod 34 from upward movement and restrains a forward location along the fishing rod 36 from downward movement.

As a result, downward force on the distal end (not shown) of the fishing rod 36, as when a fish pulls down on the fishing line (not shown) puts the fishing rod 36 in a bind, and thereby tightens the grip of the fishing rod holder 10 on the fishing rod 36. Further, the bottom of both the forward U-shaped holder portion 34 and the rear U-shaped holder portion 42 are essentially a circular arc portions with an effective diameter that is approximately the diameter of a typical fishing rod 36, but the extensions from these circular arc portions form parallel narrow sides that restrain the fishing rod 36 from side-to-side movement, as when a fish pulling on the fishing line swims from side-to-side or in circles. At the same time, the structure having the bottom leg 14 crosses the front face 18 of the square tube 12 and having the top leg 30 cross the rear face 62 of the square tube 12 puts the fishing rod holder 10 in a bind when a fish pulls down on the fishing line and fishing rod 36, tightening the grip of the fishing rod holder 10 on the square tube 12, preventing the fishing rod holder 10 from slipping. The structures that place the fishing rod holder 10 and the fishing rod 36 in to a bind that tightens their grips is are crucial features of the fishing rod holder 10. The specific shapes of the bends between the beginning of the top leg 30 and the bottom leg 14 are less significant and may be formed in a variety of shapes.

The top leg 30 flows downward along a roughly diagonal portion 44 across the right face 24 of the square tube 12 and projecting forward of the square tube 12, where it is bent to form an upwardly open circular arc portion 46 that forms the bottom of the forward U-Shaped holder portion 34. The upwardly open circular arc portion 46 includes a left side leg bracket portion 47 that helps hold the fishing rod 36. The right side of the circular arc portion 46 flows upwardly, forming a right side bracket portion 49 until it is high enough to restrain the fishing rod 36, then is bent at the bend 51, from which it flows into a rearward and downward portion 48, which continues until its lowest point 50 is approximately adjacent to the rear edge 52 of the right face 24 of the square tube 12, where the upward bend 54 carries the fishing rod holder 10 into a right side rear U-shaped bracket portion 56 that flows into the downwardly open circular arc portion 58 that forms the rear U-shaped holder portion 42, which has a left leg portion 59 and a right leg portion 61, and then flows into the downward and forward flowing portion 60, from which it flows into the bottom leg 14. It is desirable that the rear U-shaped holder portion 42 be lower than the forward U-shaped holder portion 34 so that the fishing rod 36 is at an upward angle to the horizontal when moving from the proximal end 38 to the distal end of the fishing rod 36, although the exact angle, and hence the difference in elevation of the inverted rear U-shaped holder portion 42 and the forward U-shaped holder portion 34, is not crucial and may vary over a wide range. The relationship of the two structures should, however, hold a fishing rod at more-or-less the angle preferred by fishermen, which allows the distal end of the fishing rod to be pulled down by a fish without the fishing rod going into the water.

Figure 4:
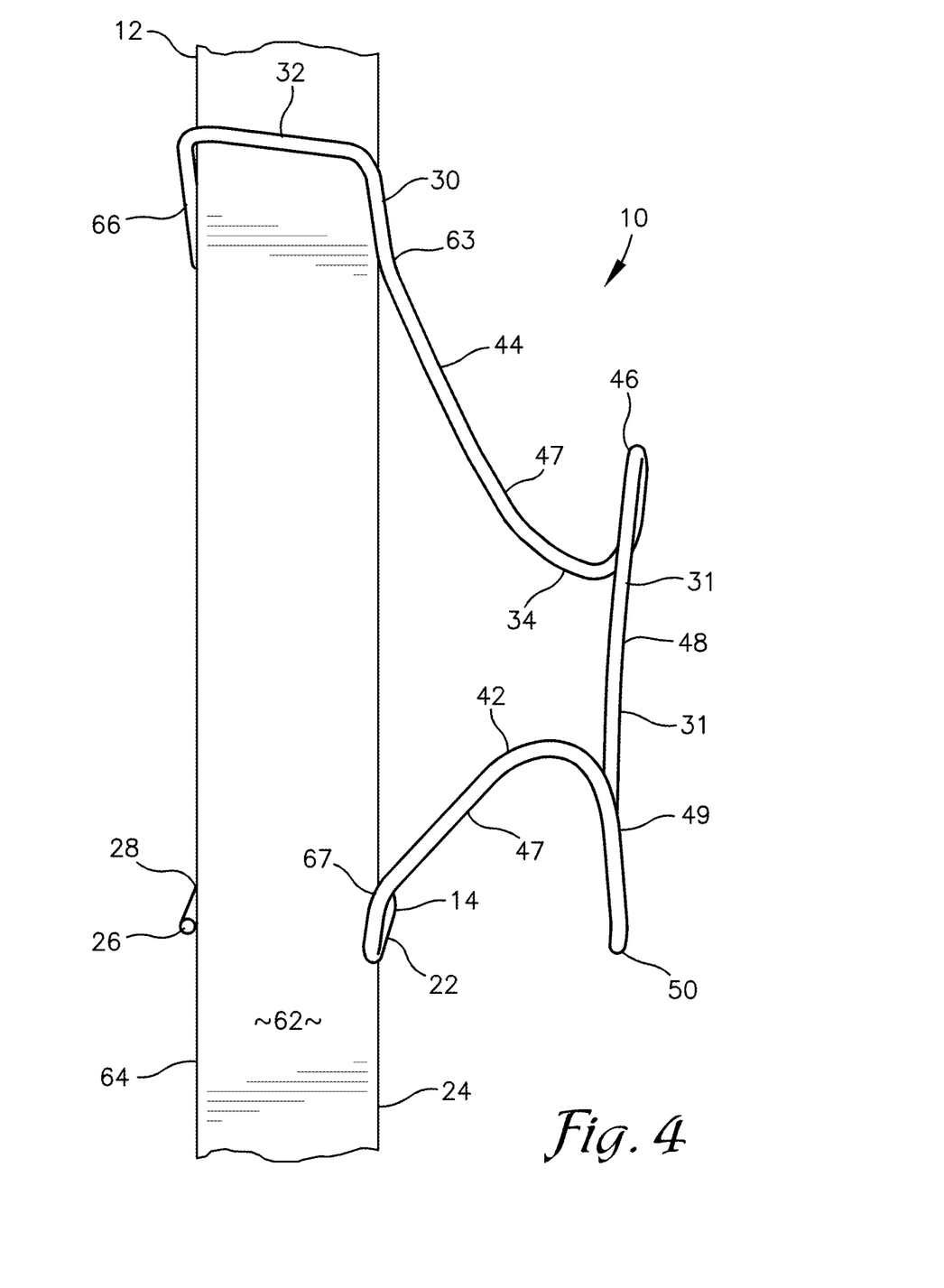
FIG. 4 is a rear view of the fishing rod holder for use on a square tube of FIG. 1 shown mounted on a square tube.

Referring to FIG. 4, the distal end 26 of the bottom leg 14 wraps around the front face 16 to contact the left face 64 of the square tube 12. The rear face contacting portion 32 of the top leg 28 passes across the rear face 62 at a downward angle from left to right, although any angle would suffice. In order to provide clearance between the fishing rod 36 and the square tube 12, the fishing rod holder portion 31 must be moved away from the square tube 28. In the embodiment shown, the fishing rod holder portion 31 is moved outwardly from the right face 24 of the square tube 12. This is accomplished by bending the wire body of the fishing rod holder 10 at the upper outward bend 63 and the lower outward bend 67. Both of the bends 63, 67 are in a range of about 25°-45°, with the preferred angle being about 30°, with the angle 63, 67 being determined in relation to the portion of the front face 24 lying between the top leg 30 and the bottom leg 14. The angles 63, 67, however, may be different than the stated angle and the angles 63, 67 need not be the same. The only requirements are that the fishing rod holder portion 31 be spaced away from the square tube 12 at a convenient distance and the inverted rear U-shaped holder portion 42 and the forward U-shaped holder portion 34 are vertically aligned.

Referring to FIG. 5, the left face contacting portion 66 of the top leg 30 crosses the left face 64 of the square tube 12 at a downward angle from right to left as viewed and is substantially parallel to the diagonal portion 44 of the top leg 30. Other geometric relationships can be used, with the primary consideration being that the left face contacting portion 66 contact the left face 64. Optionally, the left face contacting portion 66 terminates before reaching the front edge 68 of the left face 64. The bottom leg 14 continues onto the left face 64 of the square tube 12 with the left face portion 69.

Figure 6:
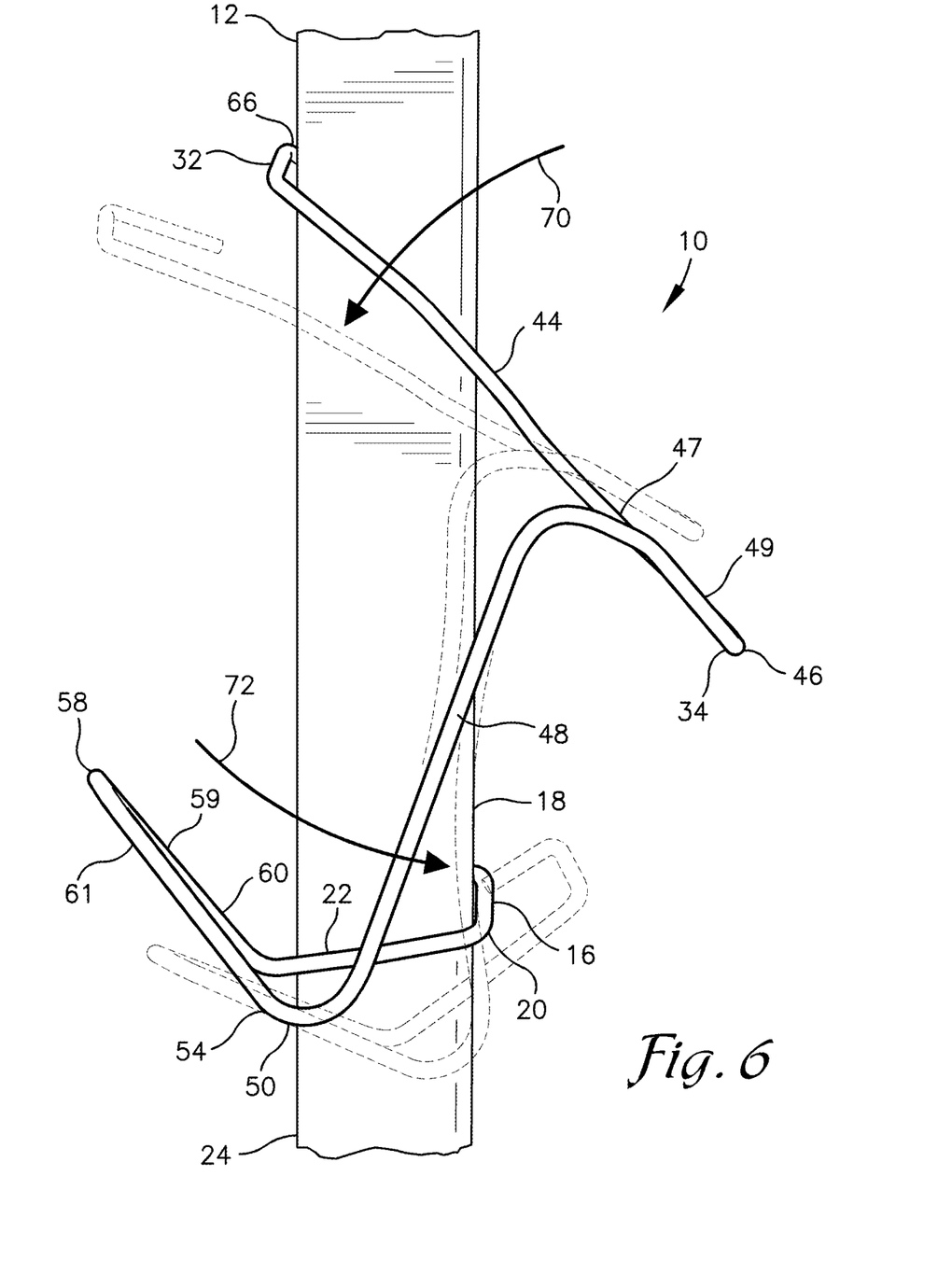
FIG. 6 is slightly offset right side perspective view of the fishing rod holder for use on a square tube of FIG. 1 mounted on a square tube and showing in phantom lines how the fishing rod holder is mounted onto a square tube and dismounted from the square tube.

Referring to FIG. 6, fishing rod holder 10 can be dismounted from the square tube 12 by pivoting the top leg 30 counterclockwise as shown by the directional arrow 70 until the top leg 30 is freed from the square tube 12 and then pivoting the bottom leg 14 counterclockwise as shown by the lower directional arrow 72 until the bottom leg 14 is freed from the square tube 12. The resulting position of the fishing rod holder 10 is shown in phantom lines. The top leg 30 may be dismounted first and then bottom leg 14 can be dismounted. This sequence can be performed with one hand. Alternatively both the top leg 30 and the bottom leg 14 can be rotated off of the square tube 12 simultaneously, which is preferably done using two hands. The fishing rod holder 10 is mounted on a square tube 14 by reversing these two steps.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims.

I claim:

1. A fishing rod holder for use on a square tube comprising in combination:
   a. a vertically oriented square tube;
   b. a fishing rod holder removably attached to said square tube, said fishing rod holder, said fishing rod holder further comprising a single length of wire bent to form a top leg for gripping the square tube;
   c. said single length of wire further bent to form a bottom leg for gripping the square tube at a point lower than said top leg when the square tube is vertically oriented;
   d. a fishing rod holding portion of said fishing rod holder lying between said top leg and said bottom leg, said fishing rod holding portion further comprising a forward U-shaped bracket portion and a rear inverted U-shaped bracket portion; and
   e. a fishing rod removably set into said fishing rod holding portion of said fishing rod holder with a forward portion of said fishing rod resting in a lowest portion of said forward U-shaped bracket for restraining the forward portion of the fishing rod from downward movement and a handle portion of said fishing rod under the highest portion of said inverted U-shaped bracket portion for restraining said handle of said fishing rod from upward movement, whereby said fishing rod is held firmly and in a bind such that more weight on a distal end of said fishing rod tightens the hold of said fishing rod holder on said fishing rod.

2. A fishing rod holder for use on a square tube comprising in combination in accordance with claim 1 wherein said top leg further comprises a portion of said fishing rod holder bent to contact a rear face of said square tube and a left face of said square tube.

3. A fishing rod holder for use on a square tube comprising in combination in accordance with claim 1 wherein said bottom leg further comprises a portion of said fishing rod holder bent to contact a right face of said square tube and a front face of said square tube.

4. A fishing rod holder for use on a square tube in accordance with claim 3 wherein said bottom leg further comprises a short distal end portion bent to contact a left face of said square tube.

5. A fishing rod holder for use on a square tube in combination in accordance with claim 1 further comprising said forward U-shaped bracket portion of said fishing rod holder lies above and forward of and said rear inverted U-shaped bracket portion of said fishing rod holder when said fishing rod holder is attached to said square tube.

6. A fishing rod holder for use on a square tube in combination in accordance with claim 1 further wherein said fishing rod portion holding portion is offset to a side of said top leg of said fishing rod holder and said bottom leg of said fishing rod holder and from said square tube, thereby providing clearance between said square tube and said fishing rod holding portion.

7. A fishing rod holder for use on a square tube comprising in combination:
   a. a vertically oriented square tube;
   b. a fishing rod holder removably attached to said square tube, said fishing rod holder further comprising a single length of wire bent to form a top leg having a U-shaped bracket formed by two spaced apart 90° bends for contacting at least two sides of said square tube including at least a rear face and a left face of said square tube and
   a bottom leg having two spaced 90° bends forming a bottom leg U-shaped bracket for contacting at least two sides of the square tube including at least a front face and a right face of the square tube;
   c. a fishing rod holding portion between said top leg and said bottom leg, said fishing rod holding portion further comprising a forward U-shaped bracket portion for restraining downward movement of a distal end of a fishing rod and a rear inverted U-shaped bracket portion for restraining the upward movement of a handle end of a fishing rod and said forward U-shaped bracket portion is in front of and higher than said rear inverted U-shaped et portion and said forward U-shaped bracket portion and said rear inverted U-shaped bracket portion lie in the same plane;
   d. a fishing rod holding portion of said fishing rod holder lying between said top leg and said bottom leg, said fishing rod holding portion further comprising a forward U-shaped bracket portion and a rear inverted U-shaped bracket portion; and
   e. a fishing rod removably set into said fishing rod holding portion of said fishing rod holder with a forward portion of said fishing rod resting in a lowest portion of said forward U-shaped bracket for restraining the forward portion of the fishing rod from downward movement and a handle portion of said fishing rod under the highest portion of said inverted U-shaped bracket portion for restraining said handle of said fishing rod from upward movement, whereby said fishing rod is held firmly and in a bind such that more weight on a distal end of said fishing rod tightens the hold of said fishing rod holder on said fishing rod.

8. A fishing rod holder for use on a square tube in combination in accordance with claim 7 further comprising an upper outward bend at a point above said forward U-shaped bracket portion and a lower outward bend at a point below said rear inverted U-shaped bracket portion whereby said fishing rod holding portion is moved offset outwardly away from the square tube.

\* \* \* \* \*